United States Patent Office 3,348,662
Patented Oct. 24, 1967

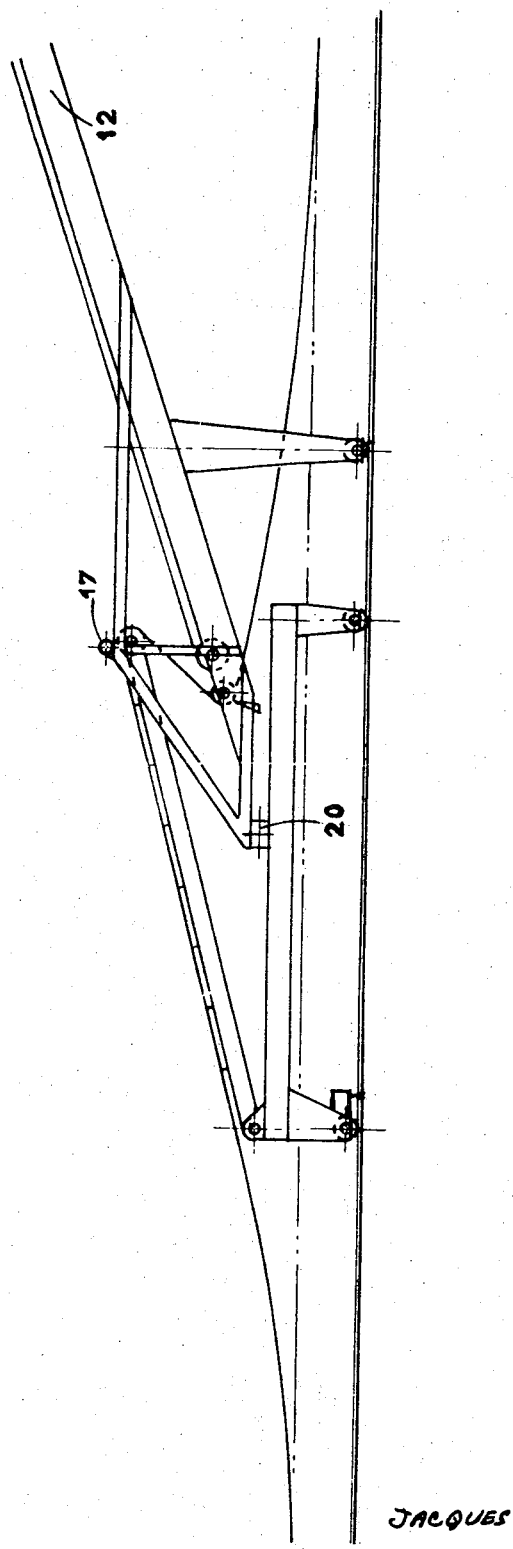

3,348,662
ARRANGEMENTS FOR THE STOCKING OF BULK
PRODUCTS WITH A COLLAPSIBLE TRIPPER
Jacques Pradon, 19 Ave. de la Tourelle,
St.-Maur-des-Fosses, France
Filed July 1, 1966, Ser. No. 562,364
Claims priority, application France, July 1, 1965,
23,113
2 Claims. (Cl. 198—186)

ABSTRACT OF THE DISCLOSURE

The invention is concerned with an arrangement for the stocking of bulk products with a collapsible tripper, comprising a tripper and a connection conveyor feeding the stocking machine. According to the invention, the tripper and the connection conveyor are placed on coaxial or aligned rail tracks. The tripper comprises a chassis on which a frame structure is hinged for swinging movement about a horizontal axis that extends perpendicular to the rail track, and is provided with roller devices supporting an endless belt running parallel to the rail tracks. The tripper hanged structure is provided with supports, and the connection conveyor is fitted with slides which, when the connection conveyor is moved toward the tripper, can come under the supports so as to lift the tripper hinge structure for movement about its pivotal axis. A bend idler, fitted on the connection conveyor, guides the belts during the motion of the connection conveyor with regard to the tripper, and, together with the tripper frame structure roller adjacent it, disposes the conveyor to convey bulk products onto the connection conveyor.

---

Figure 1:
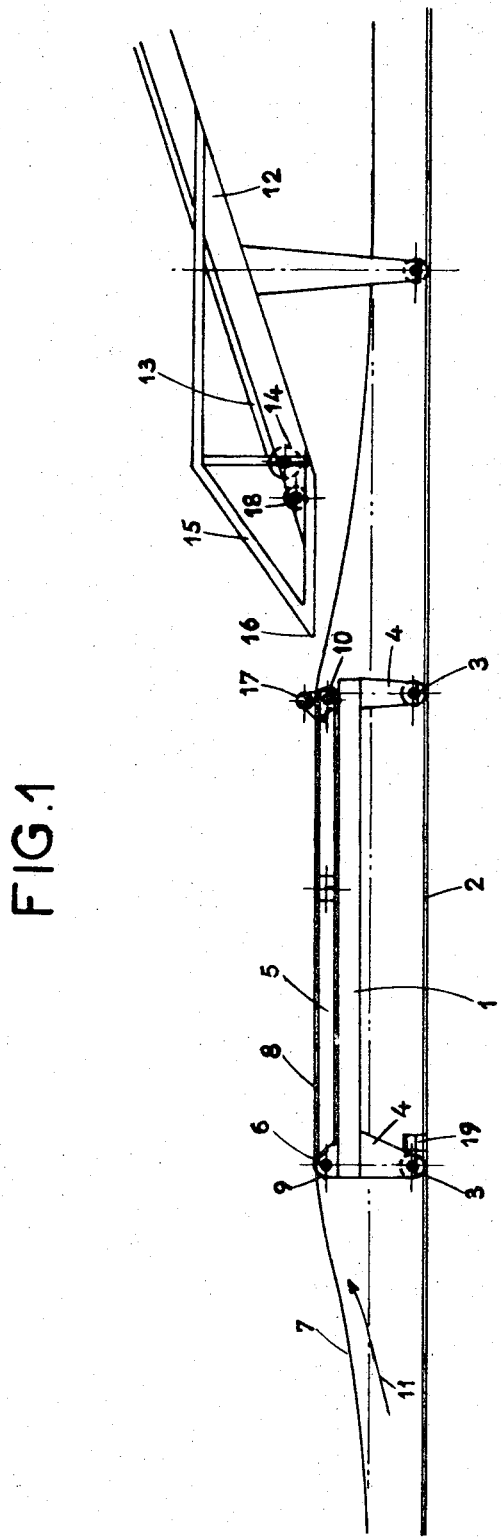

The invention has for its subject an arrangement for the stocking of bulk products with a collapsible tripper, comprising a tripper and a connection conveyor feeding the stocking machine.

When a conveyor is provided with a tripper it is well known to render the latter collapsible by creating through some means or another, for example mechanical or hydraulic, a motion of the connection conveyor with regard to the tripper, this motion collapsing the tripper.

This invention provides for ready collapsing and raising of the tripper when there is a motion of the connection conveyor with regard to the tripper.

According to the invention, the tripper and the connection conveyor are placed on coaxial or aligned rail tracks. The tripper comprises a chassis on which a frame structure is hinged on a horizontal axle perpendicular to the rail track and is provided with roller devices supporting an endless belt running parallel to the rail tracks. The hinged structure is provided with supports and the connection conveyor is fitted with slides which, when there is a motion with regard to the tripper, can come under the supports so as to lift the tripper hinged structure. A bend idler, fitted on the connection conveyor, guides the belt during the motion of the connection conveyor with regard to the tripper, and, together with the tripper frame structure roller adjacent it, disposes the conveyor to convey the bulk products onto the connection conveyor.

The invention shall now be described with more details, referring to an application taken as example and represented on the drawings.

FIGURE 1 is a schematic vertical view of an arrangement according to the invention, the connection conveyor having not created the lift of the mobile structure of the tripper in the position shown; and FIGURE 2 is a view similar to the one of FIGURE 1, the connection conveyor having lifted the mobile structure of the tripper.

The tripper comprises a chassis 1, which can travel on a rail track 2 by means of wheels 3 fitted on legs 4.

A mobile frame structure 5 can pivot around an axle 6, the axle 6 being horizontal and perpendicular to the rail track 2, and part of a suitable hinging arrangement.

An endless conveyor belt 7 runs on idlers 8 supported by the structure 5 and on pulleys 9 and 10, the belt running in the direction of the arrow 11 in normal operation.

Wheels 17 are also fitted on the structure on either side thereof and are not placed exactly vertically above it but outside or to one side of the space needed for the lifting of the structure 5 around the axle 6.

A stacking machine (not shown) is fed by a connection conveyor 12 provided with an endless belt conveyor 13 running on a pulley 14.

The structure of the connection conveyor is fitted with 2 slides or camming bars 15, both of them ended by a nose or a point which can get under the wheels 17 when the tripper is in motion with regard to the connection conveyor, that is, when, for instance, the connection conveyor is moved to the left of FIGURE 1.

The connection conveyor is also provided with an idler 18 which comes into contact with the endless belt 7 and guide this belt so as it avoids the structure of the connection conveyor 12 as relative movement brings the tripper and conveyor 12 to the positions of FIGURE 2.

The tripper 1, the connection conveyor 12 and the stacking machine (not represented) can travel on a one rail track or on separate but parallel rail tracks.

In a first position (FIGURE 1), the tripper is locked on its rail track by means of a clip 19 or any other device capable of immobilizing it. The structure 5 is then lowered to a maximum, and the arrangement works just as an ordinary conveyor having no tripper.

To set up the tripper, it is sufficient to move the stacking machine and the connection conveyor 12 toward the tripper 1; the slides 15 fit under the wheels 17 and lift one end of the structure 5 and simultaneously the bend idler 18 gets into position as the connection conveyor moves from the position of FIGURE 1 to the position of FIGURE 2.

When the working position is reached (FIGURE 2), the tripper 1 is coupled to the connection conveyor 12 through a hook 20, the tripper is released from the rail track by unlocking the clip 19, and the whole operates then as a tripper coupled to the stacking machine.

To move back to the collapsed position of the frame structure 5, the tripper 1 is locked through the clip 19, the tripper is uncoupled from the connection conveyor 12, and the travelling motion of the stacking machine and connection conveyor is put in action so as to separate them from the tripper and lower down the structure 5, the action of the bend idler 18 progressively ceasing at the same time.

The arrangement can be augmented by various accessories and especially by devices capable of putting out of action the wheels 17 i.e. moving them out of the way of the slides 15. In this case, the slides may pass on each side of the tripper without lifting the structure 5. The connection conveyor can then pass above the tripper without putting it in action. For this purpose wheels 17 are suitably mounted for this shifting movement and provided with suitable releasable locking devices to lock them in either position.

The invention is, of course, not limited by details of the application described above, as these details can be modified without getting out of the field of the invention.

What is claimed is:

1. Apparatus for conveying bulk materials comprising:
    a belt conveyor moving in a forward direction,
    a connection conveyor frame mounted over said belt conveyor for movement longitudinally thereof and including means for conveying bulk material,
    a tripper device mounted under the upper run of the belt conveyor and including a frame hinged at one end thereof to said device for swinging movement about a horizontal axis from a horizontal position to an upwardly angled position inclined upwardly in the direction of movement of said conveyor,
    said tripper frame at the other end thereof carrying camming means positioned to one side of said conveyor,
    said conveyor frame including cam bar means positioned in alignment with said tripper frame means for engaging same to swing said tripper frame to its upwardly angled position on relative movement of said conveyor frame toward said tripper device,
    a bend pulley carried by said conveyor frame adjacent the normal operating level of said belt conveyor,
    and means for releasably securing said conveyor frame to said tripper device when movement of said conveyor frame relative to said tripper device raises said tripper device frame sufficiently to bring said bend pulley into engagement with said conveyor and dispose said tripper frame other end over said conveying means.

2. The apparatus set forth in claim 1 wherein:
    said tripper device is mounted for movement longitudinally of said belt conveyor,
    and including means for releasably immobilizing said tripper device.

References Cited
UNITED STATES PATENTS 2,696,900   12/1954   Finstead _____ 198—186

FOREIGN PATENTS 1,166,087   3/1964   Germany.

EVON C. BLUNK, *Primary Examiner.*

EDWARD A. SROKA, *Examiner.*